United States Patent
Patera et al.

(10) Patent No.: US 8,192,619 B2
(45) Date of Patent: Jun. 5, 2012

(54) PORTABLE FILTRATION AND OZONATION APPARATUS

(75) Inventors: Ginger Elayne Patera, St. Joseph, MI (US); Ronald L. Voglewede, St. Joseph, MI (US); David Edward Shepherd, St. Joseph, MI (US); Tony L. Koenigsknecht, St. Joseph, MI (US); Brian David Hooks, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 787 days.

(21) Appl. No.: 11/834,776

(22) Filed: Aug. 7, 2007

(65) Prior Publication Data
US 2009/0039032 A1 Feb. 12, 2009

(51) Int. Cl.
*C02F 1/78* (2006.01)
(52) U.S. Cl. ........ 210/192; 210/205; 210/241; 210/243; 422/186.12; 204/276
(58) Field of Classification Search .......... 210/760, 210/192, 198.1, 201, 202, 205, 209, 241, 210/243, 172.1, 172.6, 464, 500.1, 244, 136; 422/28, 29, 186.07–186.16; 204/271, 240, 204/DIG. 6, 276
See application file for complete search history.

(56) References Cited

U.S. PATENT DOCUMENTS

| | | | |
|---|---|---|---|
| 2,566,371 A | 9/1951 | Quinn | |
| 2,670,081 A | 2/1954 | Quinn | |
| 3,726,404 A | 4/1973 | Troglione | |
| 4,019,986 A | 4/1977 | Burris et al. | |
| 4,714,550 A | 12/1987 | Malson et al. | |
| 5,106,495 A | 4/1992 | Hughes | |
| 5,186,830 A | 2/1993 | Rait | |
| 5,486,285 A * | 1/1996 | Feeney | 210/85 |
| 5,685,980 A | 11/1997 | Patapoff et al. | |
| 5,800,741 A | 9/1998 | Glenn et al. | |
| 5,846,418 A * | 12/1998 | Thompson et al. | 210/266 |
| 5,900,143 A | 5/1999 | Dalton et al. | |
| 5,911,957 A | 6/1999 | Khatchatrian et al. | |
| 5,914,045 A | 6/1999 | Palmer et al. | |
| 5,922,378 A | 7/1999 | Kagan et al. | |
| 5,961,326 A * | 10/1999 | Johnston et al. | 433/80 |

(Continued)

FOREIGN PATENT DOCUMENTS

DE    19911443 A1    9/2000

(Continued)

OTHER PUBLICATIONS

Machine translation of DE 19911443, Sep. 2000 (translation obtained Apr. 2009 from espacenet).*

(Continued)

*Primary Examiner* — Joseph Drodge
*Assistant Examiner* — Lucas Stelling
(74) *Attorney, Agent, or Firm* — Kirk W. Goodwin; Diederiks & Whitelaw PLC

(57) ABSTRACT

A portable fluid ozonation apparatus includes a container for treating and storing fluid, a filter that attaches to the container and an ozone generator. In use, a fluid is dispensed into the container and optionally passed through the filter. At this point, power is supplied to the ozone generator which operates for a period of time necessary for disinfecting the fluid. Additives and post filters can be utilized in conjunction with the ozonation apparatus in order to obtain sufficient purified fluid within a short time frame.

13 Claims, 5 Drawing Sheets

U.S. PATENT DOCUMENTS

| | | | |
|---|---|---|---|
| 5,997,750 | A | 12/1999 | Rozelle et al. |
| 6,042,720 | A | 3/2000 | Reber et al. |
| 6,180,003 | B1 * | 1/2001 | Reber et al. ............... 210/198.1 |
| 6,299,770 | B1 | 10/2001 | Diener et al. |
| 6,391,259 | B1 | 5/2002 | Malkin et al. |
| 6,527,109 | B2 * | 3/2003 | Schoo et al. ............... 426/112 |
| 6,565,743 | B1 | 5/2003 | Poirier et al. |
| 6,589,479 | B2 * | 7/2003 | Dufresne et al. ............... 435/31 |
| 6,827,874 | B2 * | 12/2004 | Souter et al. ............... 210/728 |
| 6,919,022 | B2 | 7/2005 | Cluff et al. |
| 2002/0185423 | A1 | 12/2002 | Boyd et al. |
| 2004/0011665 | A1 * | 1/2004 | Koizumi et al. ............... 205/626 |
| 2006/0163174 | A1 | 7/2006 | Namespetra et al. |
| 2006/0165571 | A1 | 7/2006 | Seon |
| 2006/0191824 | A1 * | 8/2006 | Arett et al. ............... 210/85 |

FOREIGN PATENT DOCUMENTS

| | | |
|---|---|---|
| GB | 2215325 A | 9/1989 |
| GB | 2228260 A | 8/1990 |
| GB | 2312175 A | 10/1997 |
| WO | 02/42216 A2 | 5/2002 |
| WO | 2004/063100 A2 | 7/2004 |
| WO | 2005/054545 | 6/2005 |

OTHER PUBLICATIONS

Muthukumar M et al. "Optimisation of Ozone Treatment for Colour and COD Removal of Acid Dye Effluent Using Central Composite Design Experiment" Dyes and Pigments, Elsevier Applied Science Publishers. Barking, GB vol. 63, No. 2, Nov. 1, 2004, pp. 127-134, XP004510030 ISSN: 0143-7208.

* cited by examiner

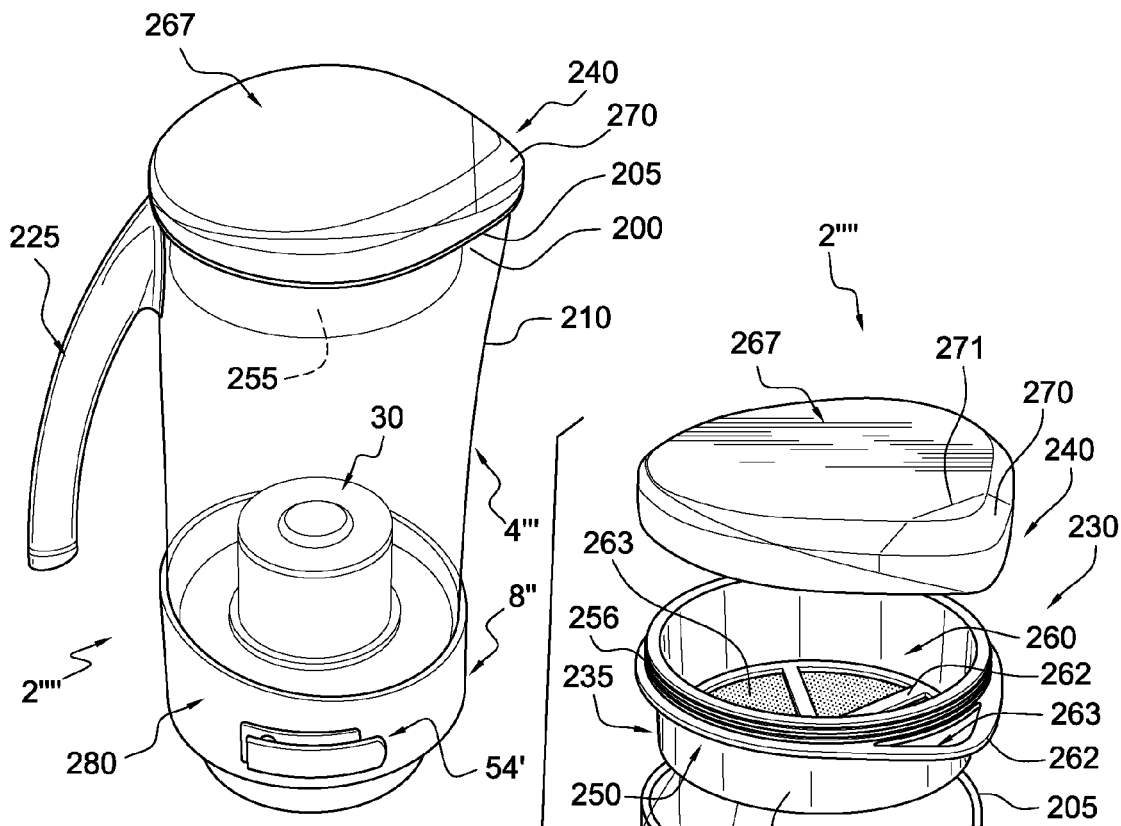
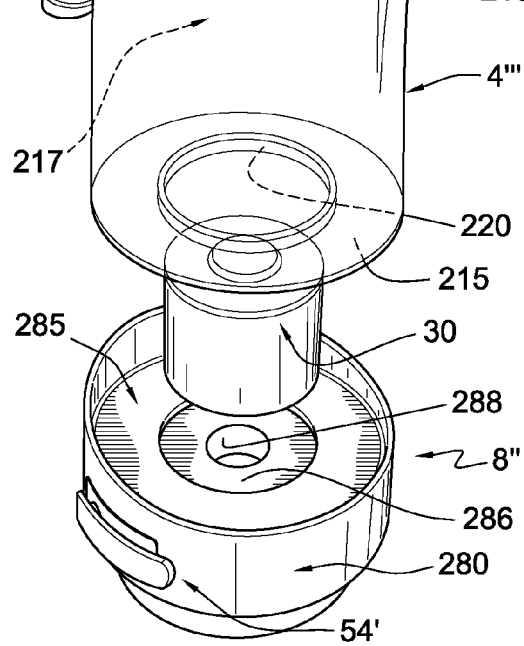
FIG. 5
FIG. 6

PORTABLE FILTRATION AND OZONATION APPARATUS

BACKGROUND OF THE INVENTION

1. Field of the Invention

The present invention pertains to the art of fluid treatment systems and, more particularly, to a portable filtration and ozonation apparatus for disinfecting fluid.

2. Description of the Related Art

Filtration and disinfecting systems are employed to provide cleaner, safer water for drinking and other uses. Most portable filtration systems used for camping or hiking are pump-style systems which include a number of components that must be assembled before, and disassembled after, each use. For example, many of the pump-style systems require separate containers, multiple hoses and pumps that must be routinely connected prior to each use and disconnected before packing the system away for travel. Many users have difficulty obtaining an adequate volume of water from such systems due to clogged filters. In addition, filters in such devices typically have limited life-spans resulting in significant costs associated with maintaining the systems. The need for replacement filters is of particular concern in disaster-type situations where potable water and spare filters can be scarce.

In order to obtain an adequate volume of safe drinking water, chemical disinfectants, such as iodine and chlorine, are often utilized. However, chemical disinfectants can have a detrimental effect on the taste and smell of the water. Thus, in order to provide an adequate water supply that is both potable and appealing to the senses, other non-chemical disinfecting methods, such as ultraviolet radiation and ozonation, have recently become more popular. Unfortunately, such systems are not designed for a user who is traveling, hiking or otherwise on the move.

Ozone is one of the strongest oxidizing agents that is readily available and easily produced for use in treating fluid. Ozone is useful in eliminating organic waste and reducing color, odor and total organic carbon. In addition, ozone kills bacteria, viruses and other microorganisms more effectively and more quickly then ultraviolet light or chemicals, such as iodine and chlorine. Of course, the effectiveness of ozone treatment, as well as the processing time required for treatment, is dependent upon the quality of the fluid being treated. High levels of sediment in the fluid may contain high levels of metals, organic fluid and carbons, which may require a longer ozone treatment period.

Based on the above, there still exists a need in the art for a portable purification system. More specifically, there exists a need for a portable ozone purification system that can be easily utilized in an outdoor or transitory setting and which includes at least one additional filtration device to decrease the treatment time.

SUMMARY OF THE INVENTION

The present invention is directed to a portable filtration and ozonation apparatus that easily, effectively and inexpensively disinfects and stores fluids. The apparatus includes a container having an opening for receiving fluid, a filter and a removable treatment cap. The treatment cap includes an ozone generator and a power source mounted therein. In use, raw or non-potable fluid is poured through the filter into the container. At this point, the treatment cap is placed onto the container to seal the opening. Next, a user inverts the container such that the non-potable fluid contacts an electrolysis cell portion of the ozone generator. The power source is then activated to energize the ozone generator and initiate the production of ozone gas which is introduced into the fluid. Preferably, the power source is in the form of a hand cranked electrical generator which is manually operated by a user. After a necessary treatment period or disinfection cycle, the ozone gas transforms the non-potable fluid into a potable fluid suitable for human consumption. At the termination of the disinfection cycle, the ozone generator is deactivated.

In accordance with one aspect of the invention, additives, such as chemical disinfectants, nutraceuticals, coagulating agents and dyes are selectively dispensed into the container via an additive storage/dispenser located in the treatment cap. In addition, the ozonation apparatus may employ one or more post filters that are utilized when dispensing treated fluid from the container. The post filters further treat, i.e., filter and/or condition the potable fluid before consumption.

In accordance with another embodiment of the invention, the ozone generator extends through a bottom wall of the container. In this configuration, the container need not be inverted to immerse the electrolysis gas cell in the fluid. In still yet another embodiment of the invention, the ozonation apparatus is incorporated into a carafe used for storing fresh water in a refrigerator. The carafe sits atop the treatment cap. In this configuration, the ozone generator extends through a bottom wall of the carafe and fluid is introduced into the carafe through an upper opening. In accordance with one aspect of this embodiment, a filter is placed within the upper opening and the fluid is initially passed through the filter before being treated with ozone gas.

Additional objects, features and advantages of the present invention will become more readily apparent from the following detailed description of preferred embodiments when taken in conjunction with the drawings wherein like reference numbers refer to corresponding parts in the several views.

BRIEF DESCRIPTION OF THE DRAWINGS

FIG. 5 is a perspective view of a portable filtration and ozonation apparatus constructed in accordance with a fifth embodiment of the present invention; and FIG. 6 is a exploded view of the portable filtration and ozonation apparatus of FIG. 5.

DETAILED DESCRIPTION OF THE PREFERRED EMBODIMENTS

Figure 1:
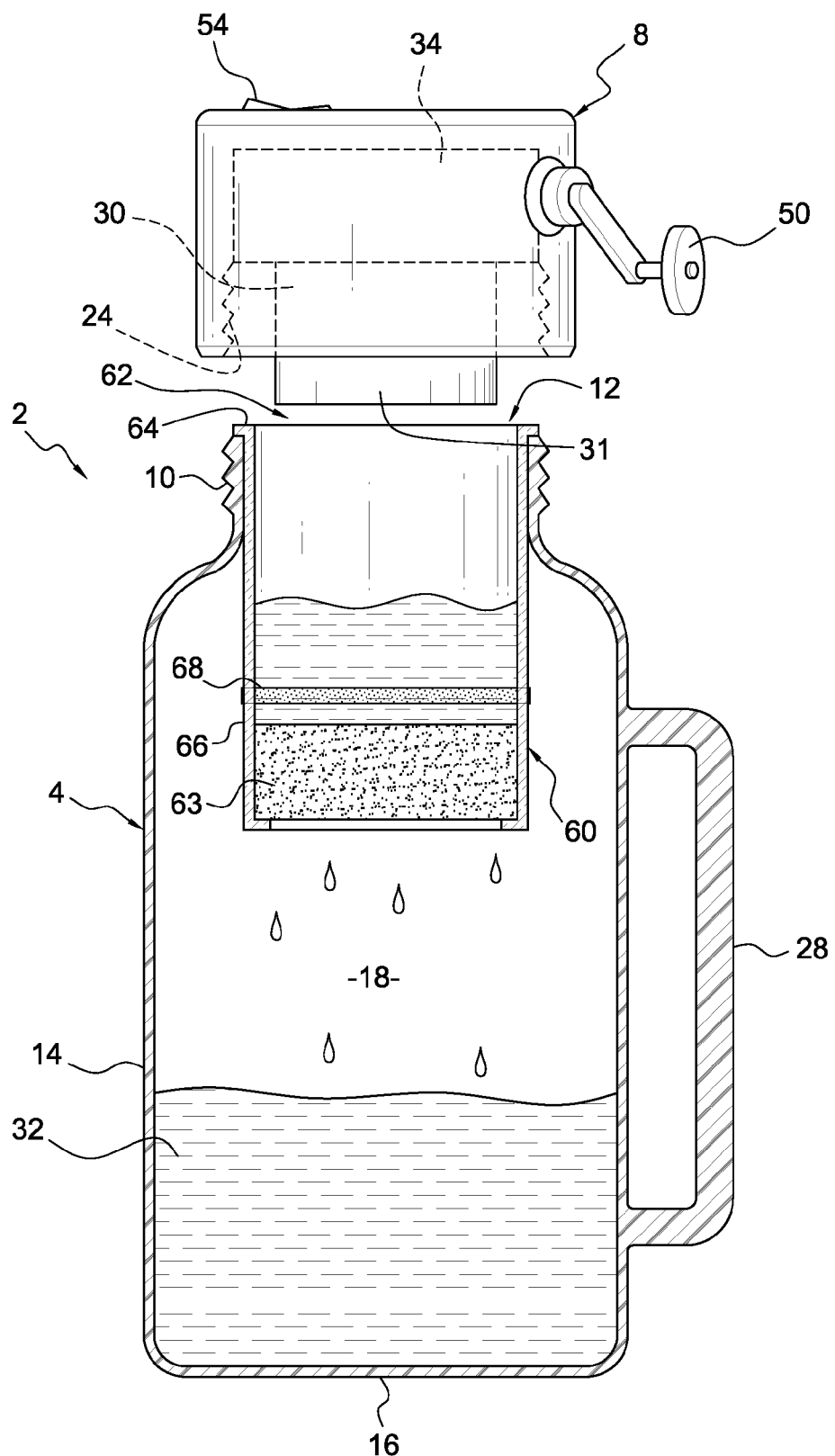
FIG. 1 is a partial cross-sectional view of a portable filtration and ozonation apparatus constructed in accordance with a first embodiment of the present invention.

With initial reference to FIG. 1, a portable filtration and ozonation apparatus for storing and disinfecting non-potable fluids constructed in accordance with a first embodiment of the present invention is generally indicated at 2. Ozonation apparatus 2 includes a beverage or fluid container 4 and a removable treatment cap 8. In the embodiment shown, container 4 is constituted by a plastic bottle, such as one formed from Nalgene®, capable of holding between one-half liter up to twenty liters or more of fluid. That being said, container 4 can be of any type of bottle sized in accordance with the desired amount of fluid to be stored and disinfected. In addition, it should be understood that container 4 can be formed from an opaque or clear material in a variety of colors and provided with indicia (not shown) printed thereon.

As shown, container 4 includes a threaded neck portion 10 having an opening 12, a sidewall portion 14 and a bottom wall portion 16 that collectively define an interior storage/treatment area 18. Treatment cap 8 includes a mating threaded portion 24 adapted to interengage with threaded neck portion 10 of container 4. In a manner known in the art, threaded neck portion 10 and mating threaded portion 24 allow a user to easily seal and unseal container 4. However, it should be readily understood that various other means for securing treatment cap 8 to container 4 can be utilized in accordance with the present invention. Container 4 is also shown to include a handle 28 that enables a user to readily grasp and operate ozonation apparatus 2 as will be described more fully below.

Ozonation apparatus 2 further includes an ozone generator 30 mounted in treatment cap 8. The particular details of this overall mounting arrangement do not form part of the present invention. The actual mounting of ozone generator 30 can be found in commonly assigned U.S. patent application Ser. No. 11/834,803 entitled "Portable Ozonation Apparatus for Storing and Purifying Liquid" filed Aug. 7, 2007. Ozone generator 30 includes an electrolysis cell 31 that extends into interior storage/treatment area 18 when treatment cap 8 is attached to container 4. As will be detailed more fully below, ozone generator 30 functions to emit ozone gas into container 4 in order to disinfect a fluid 32 contained therein. More specifically, ozone gas generated by ozone generator 30 acts as an oxidant which kills any microorganisms present in fluid 32. In accordance with the invention, ozone generator 30 is selectively energized by a power source 34 also arranged within treatment cap 8.

In the embodiment shown, power source 34 preferably includes a hand crank 50 that facilitates manual operation, replacing the need for batteries or other forms of energy devices. That is, hand-cranked electrical generators known in the art may be utilized with the present invention. For example, power source 34 can be a standard spring-loaded generator typically used by campers and hikers. Of course, ozonation apparatus could also operate with other power sources such as batteries, solar power or a plug-in connection to a separate power source. In the embodiment shown, power source 34 is connected to a power switch 54 mounted atop treatment cap 8. In the case of a hand-cranked generator, power switch 54 serves as a redundant system preventing inadvertent powering of ozone generator 30.

In further accordance with the invention, ozonation apparatus 2 also includes a pre-ozonation particle filter 60 having an upper opening 62. Particle filter 60 can take on various filter media 63 such as mesh filters, granular activated carbon filters, carbon block filters, ceramic filters, membrane filters or any other type of filter known in the art. A ceramic filter has the benefit of being cleanable and, thus, could be reused several times prior to replacement. Preferably, filter 60 is removably supported by container 4 and includes a support flange 64. Support flange 64 suspends or supports filter 60 within opening 12. More specifically, support flange 64 is constituted by short, radial collar that rests atop threaded neck portion 10 such that treatment cap 8 is still capable of being secured to container 4 with filter 60 in place. This particular configuration allows for easy transportation and/or storage of ozonation apparatus 2.

Filter 60 is also shown to include a clear housing 66 that allows a user to visually determine when filter media 63 requires replacement. In order to better facilitate visual inspection, filter 60 includes an indicator 68. Indicator 68 can take on a variety of forms such as time based indicators, flow based indicators or indicators that employ a bar graph and/or color change material. In the embodiment shown, indicator 68 takes the form of a painted or dyed disk that changes color based upon a length of time filter media 63 is exposed to or saturated with fluid. Although depicted as being located above filter 60, it should be understood that indicator 68 can be located at a variety of positions without departing from the invention.

Reference will remain with FIG. 1 in describing a method of disinfecting fluid 32. Initially, a user will pour or dispense raw, non-potable fluid into container 4 through opening 12. At this point, treatment cap 8 is seated upon threaded neck portion 10 to seal opening 12. Once opening 12 is properly sealed, container 4 is inverted to submerge electrolysis cell 31 in non-potable fluid 32. After electrolysis, cell 31 is covered by fluid, a disinfection cycle is initiated by actuating power source 34 which supplies DC current to ozone generator 30 which, in turn, begins to produce ozone gas. The ozone gas diffuses through and disinfects the non-potable fluid. After a prescribed treatment time, typically dependant upon the volume and quality of fluid to be treated, the disinfection cycle is complete and the non-potable fluid has been transformed into a potable fluid suitable for human consumption.

Typical treatment time for twenty liters of non-potable fluid is approximately 20 minutes. Of course smaller volumes of fluid will require proportionately shorter treatment times. In any event, once the disinfection cycle is complete, container 4 is again inverted and any cloudiness in the now potable fluid is given time to settle before being consumed. Conveniently, ozonation actually aids in the settling of any suspended cloudiness that may be in the fluid. Ozone decomposes to form oxygen and leaves the fluid with a sweet, fresh taste. Fluid treated by ozonation apparatus 2 can be consumed/utilized directly after treatment, or may be stored in container 4 for future use.

If the non-potable fluid should contain high levels of sediment, the time required for disinfection may be increased. In order to reduce the time required for disinfection, non-potable fluid is initially passed through filter 60 to remove any sediments prior to treatment. When pre-treatment is desired, a user simply places filter 60 in opening 12 and pours the non-potable fluid 2 into upper opening 62. The non-potable fluid passes through filter media 63 and into storage/treatment area 18. Once container 4 is filled to a desired level, filter 60 is removed and treatment cap 8 is installed over opening 12. At this point, the process continues as described above. As noted above, filter 60 is typically employed in situations where water quality is more questionable so as to reduce the time required for the disinfection cycle. When water quality levels are higher, pre-treatment may be eliminated from the process to extend the overall service life of filter 60.

Figure 2:
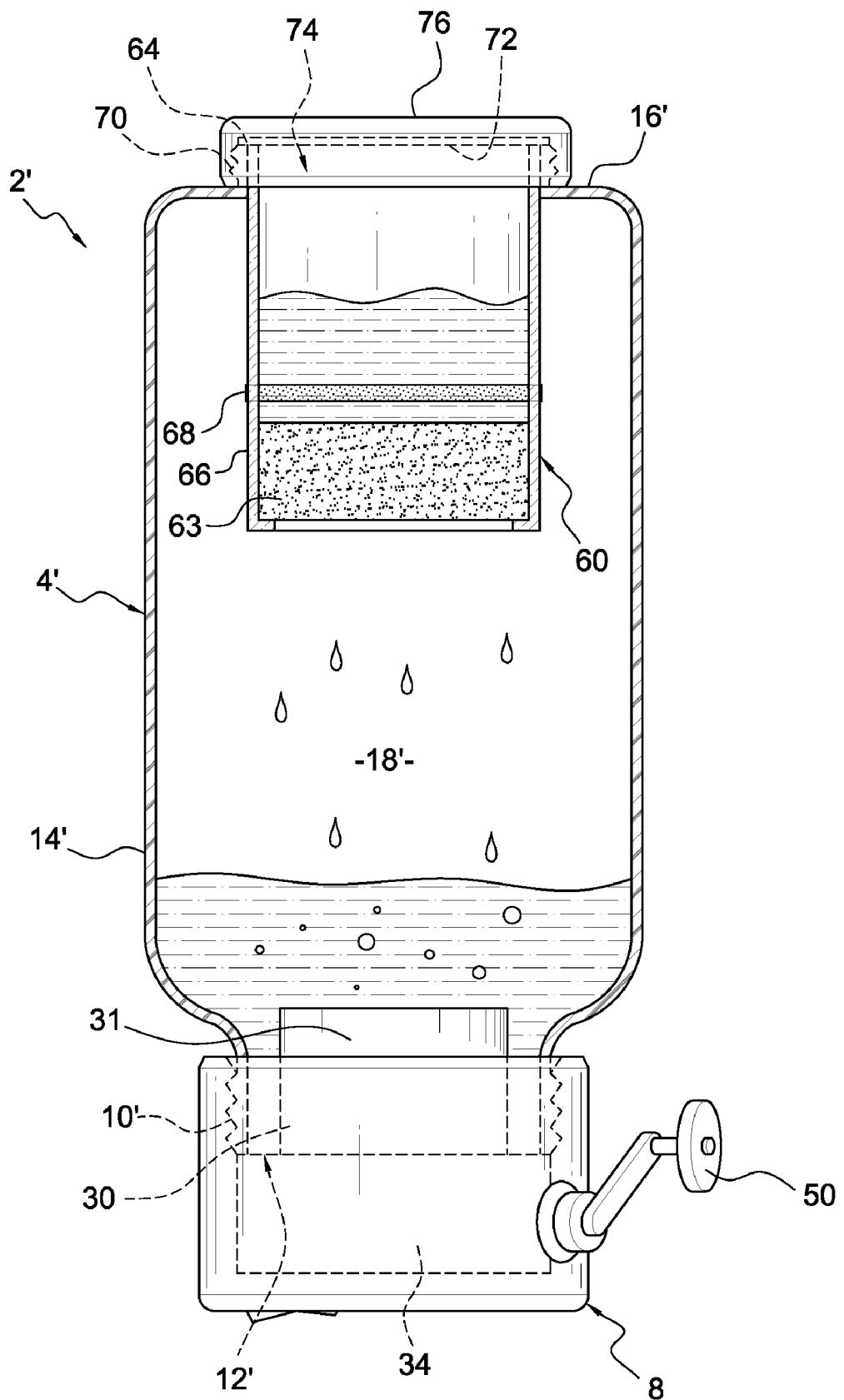
FIG. 2 is a cross-sectional view of the portable filtration and ozonation apparatus constructed in accordance with a second embodiment of the present invention.

Reference will now be made to FIG. 2 wherein like reference numbers represent corresponding parts in the respective views in describing a second embodiment of the present invention. As shown, an ozonation apparatus 2' includes a container 4' having a first threaded neck portion 10' provided with an opening 12', a sidewall portion 14' and a bottom wall portion 16' that collectively define an interior storage/treatment area 18'. In the embodiment shown, container 4' also includes a second threaded neck portion 70 that extends from bottom wall portion 16'. Second threaded neck portion 70 includes an outer, peripheral rim 72 that defines an opening 74. In accordance with this arrangement, filter 60 is inserted into container 4' through opening 74 such that flange 64 rests upon rim 72. After raw or non-potable fluid is poured through filter media 63, a lid 76 having internal threads (not shown) is placed over opening 74 and secured to second threaded neck portion 70 to seal container 4'. In this manner, the disinfection cycle is initiated without requiring that container 4' be inverted as the non-potable fluid will already be in contact with electrolysis cell 31. That is, in this configuration, electrolysis cell 31 becomes submerged as the non-potable fluid enters container 4'. Of course, the disinfection cycle could also take place as described above with the step of pre-filtering the non-potable fluid being omitted if the fluid quality is not particularly poor.

Figure 3:
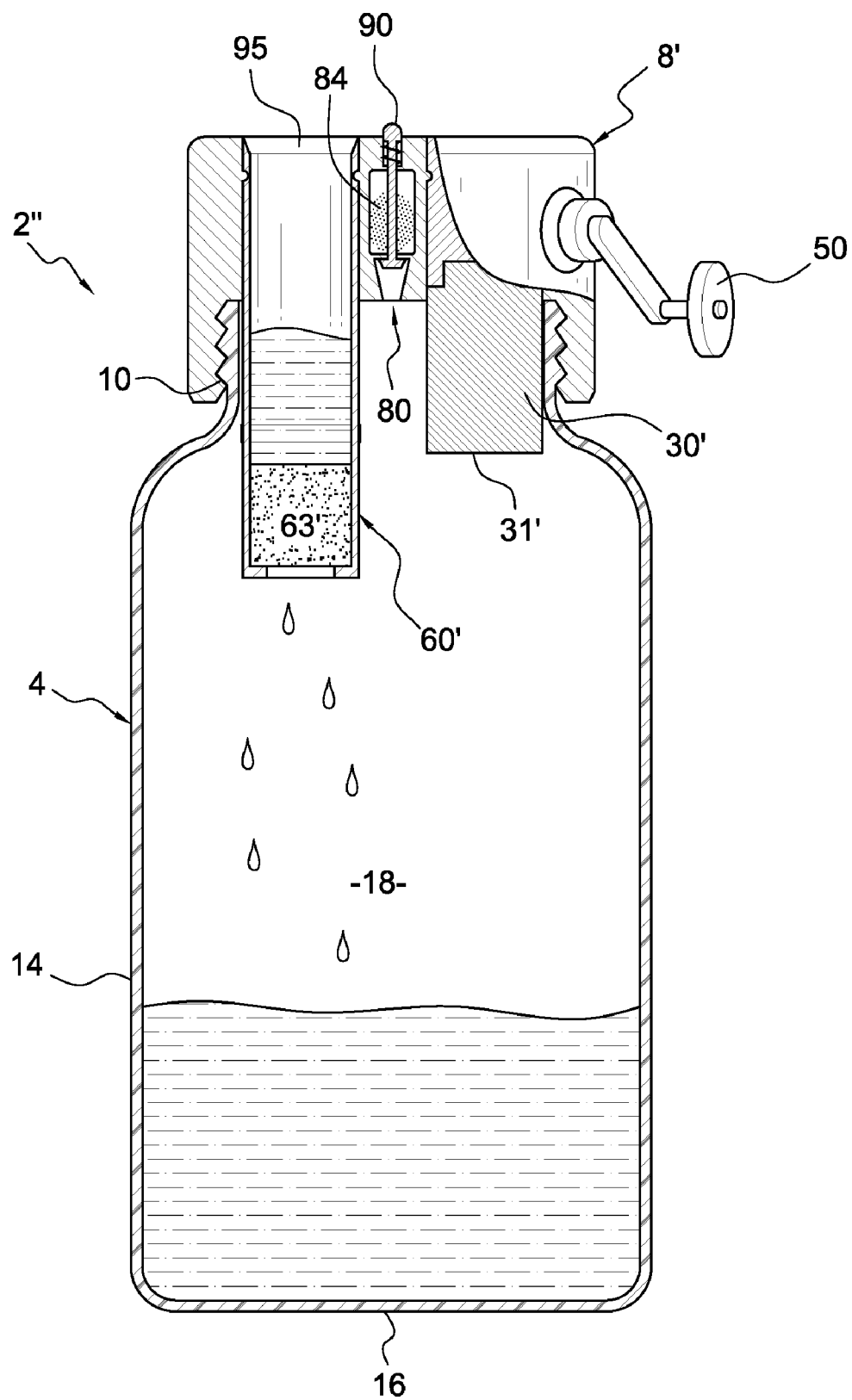
FIG. 3 is a cross-sectional view of the portable filtration and ozonation apparatus constructed in accordance with a third embodiment of the present invention.

Reference will now be made to FIG. 3, where like reference numbers represent corresponding parts in the respective views in describing a third embodiment of the present invention. In accordance with the embodiment shown, an ozonation apparatus 2" includes a treatment cap 8' provided with an ozone generator 30', a power source (not shown), a removable filter 60' and an additive storage/dispenser 80 for selectively storing and dispensing an additive 84 either before, during or after the disinfection cycle. Additive storage/dispenser 80 is preferably a self-contained removable unit that is readily replaced as needed. Additive storage/dispenser 80 is preferably calibrated to dispense a pre-determined amount of additive. The amount of additive dispensed is typically based on the type of additive used and the particular effect desired. Additive 84 may include chemical disinfectants, dyes, coagulators, minerals or other health related chemicals, e.g., nutraceuticals. The type of additive 84 employed at any given time is based on user needs, preferences and/or regional fluid characteristics. In accordance with one aspect of the invention, additive 84 is a colored dye which is added to the non-potable fluid prior to initiating the disinfection cycle. Ozone gas introduced into the non-potable fluid gradually removes any coloration created by the dye and thus provides a visual cue to the user indicating that the disinfection cycle is in progress or complete.

In the embodiment shown, additive/storage dispenser 80 is in the form of a manually actuated dispenser including an actuator 90. However, it should be readily understood that additive/storage dispenser 80 could be in various other forms, including automatic dispensers, pump dispensers and the like without departing from the spirit of the invention. In the case of an automatic dispenser, dye is either injected into container 4 at an initial stage of the disinfection cycle or after the ozone gas in container 4 reaches a predetermined level.

In accordance with another aspect of the invention, additive/storage dispenser 80 is calibrated to dispense an amount of coagulating agent required to pre-treat eight ounces of fluid prior to ozonation. Coagulating agents react with the non-potable fluid and "capture" undesirable substances prior to ozonation thereby reducing the time required for a disinfection cycle while also eliminating any ozonation byproducts.

In accordance with another aspect of the invention illustrated in FIG. 3, treatment cap 8' is shown to include an opening 95 that leads to filter 60'. Opening 95 is provided to allow a user to add fluid to container 4 without requiring the removal of treatment cap 8. Once a desired amount of non-potable fluid is in storage/treatment area 18, a cover (not shown) is placed over opening 95, ozonation apparatus 2' is inverted, and a disinfection cycle is initiated in a manner corresponding to that described above in accordance with the first embodiment of the invention. With this configuration, filter 60' is constituted by a one-way filter that prevents fluid in container 4 from flowing backwards through filter media 63' when container 4 is inverted.

Figure 4:
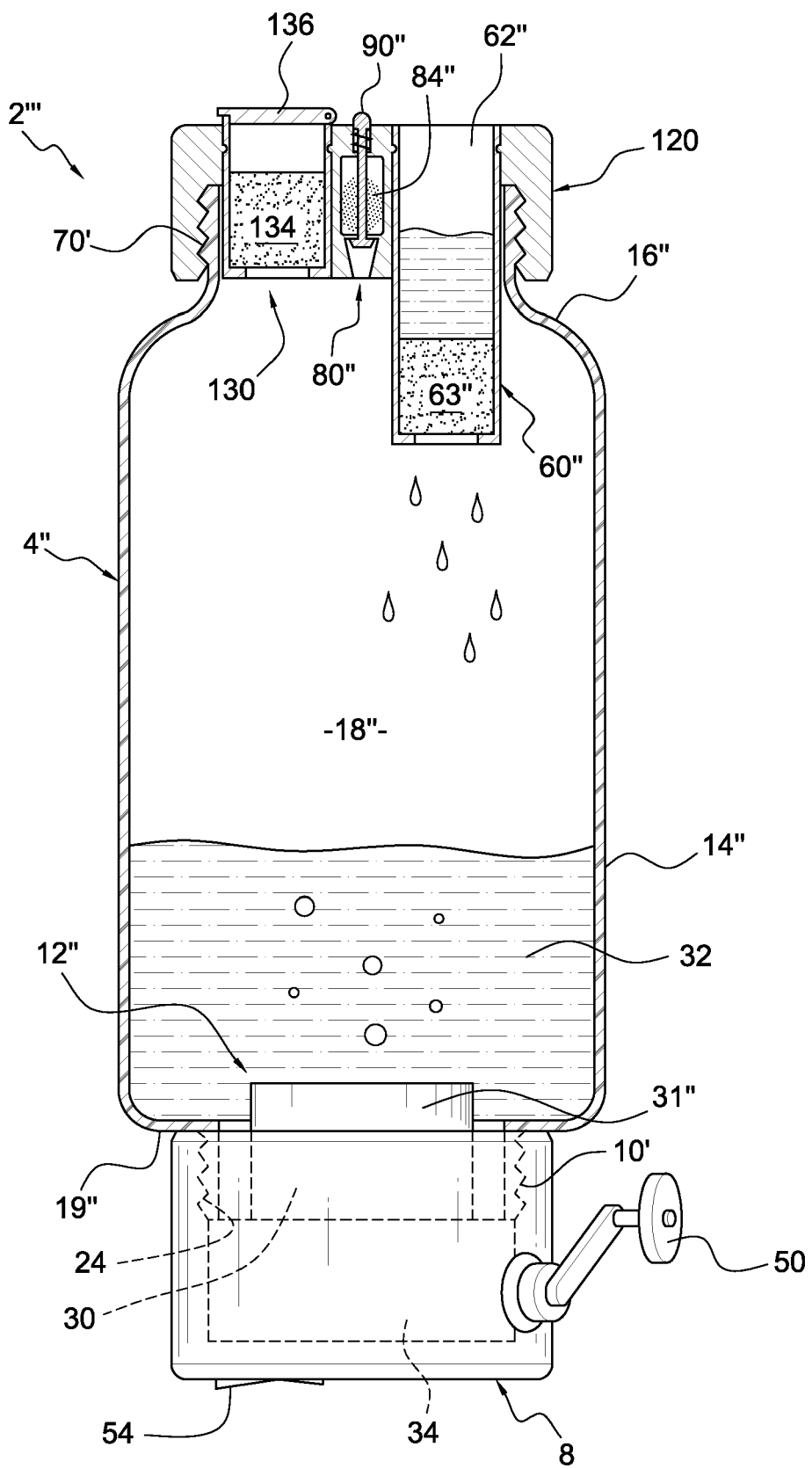
FIG. 4 is a cross-sectional view of the portable filtration and ozonation apparatus constructed in accordance with a fourth embodiment of the present invention.

Reference will now be made to FIG. 4, wherein like reference numbers represent corresponding parts in the respective views, in describing a fourth embodiment of the present invention. In accordance with the embodiment shown, an ozonation apparatus 2''' includes a container 4" having a first threaded neck portion 10" defining an opening 12", a sidewall portion 14" and a bottom wall portion 16" that collectively define a storage/treatment area 18". Bottom wall portion 16" preferably includes a second threaded neck portion 70" which defines a second opening (not separately labeled). In a manner similar to that described above, ozonation apparatus 2''' includes a treatment cap 8 having arranged therein an ozonation generator 30 including an electrolysis cell 31, and power source 34 defined by a manually operated generator having a hand crank 50. In addition, ozonation apparatus 2''' includes a secondary cap 120 that engages with second thread neck portion 70' to close the second opening. Secondary cap 120 includes a one-way filter 60", an additive storage/dispenser 80" including an actuator 90", and a post-treatment filter 130.

In use non-potable fluid 3 is poured through an opening 62" in filter 60" and passes through filter media 63" prior to entering interior storage/treatment compartment area 18". If desired, a user may dispense an additive 84" from a storage/dispenser 80" into interior storage/treatment area 18" either before, after or during ozonation of non-potable fluid 32. After completing a disinfection cycle, treatment cap 8" is removed from threaded neck portion 10" and treated or potable fluid is poured from container 4" through opening 12". Alternatively, secondary cap 120 may be removed in order to dispense fluid through opening 74". As a third option, the user may desire post disinfection cycle filtering of the potable fluid. In accordance with the embodiment shown, secondary cap 120 includes a post-treatment filter 130. Post-treatment filter 130 includes a filter media 134 and a spout 136 having a lid that facilitates dispensing fluid from container 4". Filter media 134 may be of any type of filter desirable for use with ozonation apparatus 2''', such as a mesh filter, a granulated activated carbon filter, a carbon block filter, a ceramic filter, a membrane filter or the like.

In accordance with another aspect of the present embodiment, one or more nutraceuticals, in soluble form, are incorporated into post-treatment filter 130. With this arrangement, fluid exiting through post-treatment filter 130 is further enhanced with dissolved nutraceuticals. At this point, it should be readily understood that the various embodiments of the ozonation apparatus constructed in accordance with the present invention are designed to be readily transported enabling an individual to readily obtain, treat and carry a supply of potable fluid such as water for his/her consumption throughout a given day. Such a self-contained portable apparatus is also suitable for use in disaster relief and military operations.

Reference will now be made to FIGS. 5 and 6, wherein like reference numbers represent corresponding parts in the respective views, in describing a fifth embodiment of the present invention. In accordance with the embodiment shown, an ozonation apparatus 2'''' includes a container 4''' having a top portion 200 defined by a rim 205 which establishes an opening 206. Container 4''' also includes a sidewall portion 210 leading to a bottom wall portion 215 that defines an interior storage/treatment area 217. As shown, bottom wall portion 215 includes an opening 220 for receiving ozone generator 30. In further accordance with the embodiment shown, container 4''' includes a handle 225 that enables a user to readily grasp and dispense treated fluid. Container 4''' preferably includes an upper cap 230 including a spout portion 235 and a lid or cover portion 240.

Spout portion 235 preferably includes a flange portion 250 including a lower section 255 that is sized to be received within opening 206 of container 4'''. Lower section 255 extends to an upper section 256 to define a pre-treatment area 260. Pre-treatment area 260 includes a plurality of spaced base members, one of which is indicated at 262, and a filter 263. Of course, is should be understood that, in addition to filter 263, additional filtering material(s) can also be placed within pre-treatment area 260. In any event, upper section 256 is shown to include a threaded region which, as will be discussed more fully below, is configured to receive lid 240. As best shown in FIG. 6, flange portion 250 also includes a lip 262 having an opening 263 that facilitates dispensing fluid from interior storage/treatment area 217.

Lid portion 240 is attached to spout portion 235 in order to facilitate treatment and/or maintain freshness of any treated fluid in container 4'''. As shown, lid portion 240 includes a main body 267 having an internal threaded region (not shown) adapted to matingly engage with a upper section 256 of spout portion 235. Lid portion 240 is also shown to include a pivoting cap 270 having an associated living hinge 271 that enables cap 270 to be selectively opened to allow dispensing of fluid through opening 263 of flange portion 250.

In further accordance with the embodiment shown, ozonation apparatus 2'''' includes a treatment cap 8'' having a main body 280 provided with a recessed region 285 having a stepped zone 286 and a central opening 288. Stepped zone 286 is designed to receive ozone generator 30, with opening 288 serving as an interface between ozone generator 30 and a power source (not shown). More specifically, ozone generator 30 is detachably mounted to treatment cap 8'' at opening 288 to enable replacement as necessary. Once ozone generator 30 is properly secured, container 4''' is seated within recessed region 285 of treatment cap 8''. When fully seated, ozone generator 30 extends through opening 220 of bottom wall 215 into storage/treatment area 217. At this point, container 4''' is filled with fluid and ozone generator 30 is activated through, for example, manipulation of a power switch 54' to initiate a treatment process. After treatment, the fluid can be selectively dispensed through opening 262. It should be recognized that the ozonation apparatus constructed in accordance with the fifth embodiment of the present invention constitutes a carafe that is designed for home use rather than outdoor situations and can be readily stored within a refrigerator to provide cool, treated water for a consumer.

Although described with reference to preferred embodiments of the invention, it should be understood that additional changes and/or modifications can be made without departing from the spirit of the invention. For instance, although only one post-filter has been discussed, it should be understood that multiple filters or a multilayered filter could also be employed. Additionally, the manner in which the treatment cap is attached to a container may be altered without departing from the invention. In general, the invention should only be limited by the scope of the following claims.

What is claimed is:

1. A portable ozonation apparatus for storing and disinfecting fluid comprising:
    a container having a sidewall, and an opening;
    a cap adapted to seal the opening of the container, the cap including an ozone generator incorporated therein;
    a power source in communication with the ozone generator; and
    a removable particle filter including a fluid opening, the removable particle filter being adapted to filter a fluid prior to the fluid entering the container.

2. The portable ozonation apparatus according to claim 1, wherein the ozone generator includes an electrolysis cell that extends into the container.

3. The portable ozonation apparatus of claim 1, wherein the particle filter further comprises an indicator for notifying a user when the filter needs replacement or cleaning.

4. The portable ozonation apparatus of claim 1, wherein the particle filter is selected from the group consisting of: a carbon filter, a ceramic filter and a membrane filter.

5. The portable ozonation apparatus of claim 1, wherein the particle filter is incorporated into the cap.

6. The portable ozonation apparatus of claim 1, wherein the particle filter includes a means for attaching the filter to the container.

7. The portable ozonation apparatus of claim 1, further comprising an actuation switch.

8. The portable ozonation apparatus of claim 1, wherein the power source is constituted by a hand-crank electrical generator.

9. The portable ozonation apparatus of claim 1, further comprising a post-filter adapted to filter fluid dispensed from the container.

10. The portable ozonation apparatus of claim 1, further comprising an additive dispenser.

11. The portable ozonation apparatus of claim 10, wherein the additive dispenser is adapted to dispense an additive directly into the container.

12. The portable ozonation apparatus of claim 10, further comprising a dye within the additive dispenser, wherein the dye is adapted to provide a visual cue to a user that a disinfection cycle is in progress when added to a fluid within the container prior to an ozonation event.

13. The portable ozonation apparatus of claim 10, further comprising a coagulating agent within the additive dispenser, wherein the coagulating agent is adapted to capture undesirable substances prior to ozonation.

* * * * *